United States Patent
Wakui

(10) Patent No.: US 6,314,725 B1
(45) Date of Patent: Nov. 13, 2001

(54) CONTROL DEVICE FOR INTERNAL COMBUSTION ENGINE

(75) Inventor: Masayuki Wakui, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/545,411

(22) Filed: Apr. 7, 2000

(30) Foreign Application Priority Data

May 12, 1999 (JP) .................................................. 11-131904

(51) Int. Cl.[7] ............................................................. F01N 3/00
(52) U.S. Cl. ................................. 60/295; 60/299; 60/301; 60/285
(58) Field of Search .............................. 60/285, 301, 297, 60/299, 295

(56) References Cited

U.S. PATENT DOCUMENTS

| 5,386,695 | * | 2/1995 | Iwata et al. | 60/276 |
| 5,482,020 | * | 1/1996 | Shimizu et al. | 123/417 |
| 5,657,627 | * | 8/1997 | Akazaki et al. | 60/285 |
| 5,956,948 | * | 9/1999 | Nagashima et al. | 60/297 |
| 5,992,144 | * | 11/1999 | Takanohashi et al. | 60/286 |
| 6,006,725 | * | 12/1999 | Stefanopoulou et al. | 123/90.15 |
| 6,134,884 | * | 10/2000 | Morinaga | 60/285 |
| 6,151,890 | * | 11/2000 | Hoshi | 60/297 |

FOREIGN PATENT DOCUMENTS 10-82333    3/1998   (JP) .

* cited by examiner

Primary Examiner—Thomas Denion
Assistant Examiner—Diem Tran
(74) Attorney, Agent, or Firm—Arent Fox Kintner Plotkin & Kahn, PLLC

(57) ABSTRACT

In an engine 3, the phase of an intake camshaft 6 and/or an exhaust camshaft 7 for opening and closing intake valves 4 and/or exhaust valves 5 can be changed relative to a crankshaft 9, and NOx produced during lean-burn operation is occluded by a NOx occlusion catalyst 14. An ECU 2 of a control device 1 increases the amount of fuel such that an air-fuel ratio A/F used during the lean-burn operation is enriched by an enrichment amount R1, to thereby purge the NOx occlusion catalyst of NOx occluded therein and controls to change the phase CAIN of the intake camshaft 6 towards the advance side relative to the crankshaft 9.

6 Claims, 6 Drawing Sheets

US 6,314,725 B1

CONTROL DEVICE FOR INTERNAL COMBUSTION ENGINE

BACKGROUND OF THE INVENTION

1. Field of the Invention

The present invention relates to a control device for an internal combustion engine in which the phase of an intake camshaft and/or an exhaust camshaft can be changed relative to a crankshaft and in which NOx produced in lean-burn operation is occluded by a NOx occlusion catalytic converter, and more particularly to a control device for internal combustion engines for performing a so-called rich spike control or controlling to temporarily enrich an air-fuel ratio used in the lean-burn operation so as to thereby purge the NOx occlusion catalytic converter of NOx occluded therein.

2. Description of the Related Art

Conventionally, a control device for an internal combustion engine of this type is known which is described in JP-A-10-82333. The internal combustion engines comprises a catalytic converter, fuel injectors and a cam phase changing mechanism for advancing or retarding the phase of an intake camshaft relative to a crankshaft. The control device controls the internal combustion engine so as to perform a lean-burn operation within a predetermined area and also controls the operation of the cam phase changing mechanism so as to advance or retard the intake valve opening and closing timings in response to the operation of the internal combustion engine. The catalytic converter is a combination of a NOx occlusion catalyst for occluding NOx in exhaust gas resulting from lean-burn operation and a normal three-way catalyst for reducing NOx in exhaust gas resulting from the operation of the internal combustion engine other than the lean-burn operation.

In general, since the NOx occlusion capacity of a NOx occlusion catalyst is limited, when the lean-burn operation of an internal combustion engine continues a long time, the occlusion capacity of the catalyst is reduced. To cope with this, in the aforesaid control device, a rich spike control is performed in which the air-fuel ratio is enriched by 0.3 seconds every time the lean-burn operation exceeds 30 seconds to thereby reduce the oxygen concentration in the exhaust gas. Thus, the NOx occlusion capacity of the NOx occlusion catalyst is recovered by performing the rich spike control periodically to expel NOx occluded in the NOx occlusion catalyst. On the other hand, NOx expelled from the NOx occlusion catalyst is reduced by the three-way catalyst. Furthermore, in this control device, the cam phase changing mechanism is prohibited from operating when the rich spike control is performed, whereby the phase of the intake camshaft is constructed to be fixed. This is because the cam phase changing mechanism is constructed to operate in a hydraulic fashion, and therefore in a case where the phase of the intake camshaft is changed in response to the rich spike control, the response of the cam phase changing mechanism is low and this causes a delay in response until an actual phase change is initiated, whereby the condition of the exhaust gas and the drivability of the vehicle are prevented from getting worse due to the delayed response.

According to the aforesaid conventional control device for internal combustion engines, since the rich spike control is performed during the lean-burn operation with the phase of the intake camshaft being fixed, as shown in FIG. 6, there is caused torque fluctuation in which the engine torque is temporarily increased in conjunction with enrichment of the air-fuel ratio (A/F) during the rich spike control, whereby the drivability is deteriorated. In addition, as shown in the same figure, the NOx content in the exhaust gas is temporarily increased in conjunction with the enrichment of the air-fuel ratio, and this increases the load borne by the three-way catalyst of the catalytic converter, whereby the amount of NOx is increased which is discharged without being reduced by the three-way catalyst. If the execution interval of the aforesaid rich spike control is shortened with a view to avoiding this, the engine is operated with the enriched air-fuel ratio more frequently, resulting in deterioration in fuel consumption.

SUMMARY OF THE INVENTION

The present invention was made to solve the above problem, and an object thereof is to provide a control device for internal combustion engines which can suppress the torque fluctuation to thereby improve the drivability and can reduce the frequency at which the rich spike control is performed to thereby improve the fuel consumption.

According to a first feature of the invention, there is provided a control device 1 for internal combustion engines (engine 3) in which at least either the phase of an intake camshaft 6 for opening and closing intake valves 4 or the phase of an exhaust camshaft 7 for opening and closing exhaust valves 5 can be changed relative to a crankshaft 9, and in which $NO_x$ produced in lean-bum operation is occluded by a $NO_x$ occlusion catalyst (for example, a catalytic converter 14 to be described in a mode for carrying out the invention (hereinafter, referred to as the same for this item)), the control device comprising an increasing means (ECU 2, step 11 in FIG. 2) for increasing the amount of fuel so as to enrich by a predetermined degree of richness (enrichment amount R1) an air-fuel ratio A/F used in the lean-burn operation to thereby purge the $NO_x$ occlusion catalyst (catalytic converter 14) of $NO_x$ occluded therein and a control means (ECU 2) for controlling to change at least either the phase CAIN of the intake camshaft 6 or the phase CAIN of the exhaust camshaft 7 such that the phase CAIN of the intake camshaft 6 advances relative to the crankshaft 9 (step 8 in FIG. 2) or the phase CAIN of the exhaust camshaft 7 retards relative to the crankshaft 9 in response to the predetermined degree of richness (enrichment amount R1) by which the air-fuel ratio A/F is enriched.

According to this control device for internal combustion engines, the increasing means expels NOx occluded in the NOx occlusion catalyst by increasing the amount of fuel so as to enrich the air-fuel ratio in the lean-burn operation by the predetermined degree of richness, and the control means controls such that the phase of the intake camshaft advances relative to the crankshaft and/or the phase of the exhaust camshaft retards relative to the crankshaft in response to the predetermined degree of richness by which the air-fuel ratio is enriched.

In general, in a case where the air-fuel ratio is enriched by performing a rich spike control in which fuel feed is temporarily increased during lean-burn operation, torque fluctuation is generated when the NOx amount and torque are increased. On the other hand, in a case where the valve overlap (a period when intake valves and exhaust valves are both open as shown in FIG. 5) is extended by advancing the phase of the intake camshaft relative to the crankshaft and/or retarding the phase of the exhaust camshaft relative to the crankshaft, the amount of internal EGR is increased and the combustion temperature is lowered, whereby not only can the amount of NOx be suppressed but also the torque fluctuation can be suppressed (states indicated by dotted lines in FIG. 6). The control described above can, therefore, restrain the amount of NOx generated, and as a result of this, the drivability can be improved. In addition, since the NOx amount can be suppressed, the time period through which a rich spike control can be performed can be extended, and this in turn reduces the frequency at which rich spike controls are performed, resulting in improvement in fuel economy.

In the above operation, the change in phase CAIN relative to the crankshaft of at least either the intake camshaft 6 or the exhaust camshaft 7 is performed by a cam phase changing mechanism 8 adapted to be driven hydraulically, and preferably, the control means (ECU 2) controls the driving of the cam phase changing mechanism 8 such that the controlling to change at least either the phase CAIN of the intake camshaft 6 or the phase CAIN of the exhaust camshaft 7 (step 8 in FIG. 2) is performed a predetermined time (a lead time Tma) prior to (at a time t1 in FIG. 4) a timing (at a time t2 in FIG. 4) when the fuel increase is started by the increasing means.

According to the control device for internal combustion engines, since the change in phase of the intake camshaft and/or the exhaust camshaft is carried out by actuating hydraulically the cam phase changing mechanism, due to its low response, there is caused a delay in response from the time when the cam changing mechanism is actuated to the time when the phase of the intake camshaft and/or the exhaust camshaft is actually changed. In this case, since the control means controls the driving of the cam phase changing mechanism the predetermined time prior to the timing when the fuel increase is started, the delay in response can be compensated for by properly setting the predetermined time to match the delay in response, thereby making it possible to synchronize the timing when the fuel increase is initiated with the timing when the phase of the intake camshaft is started to advance and/or the phase of the exhaust camshaft is started to retard. Thus, the changes in NOx amount and engine torque resulting in conjunction with increase in fuel injected can be suppressed at an appropriate timing without any delay in response, whereby the drivability can further be improved.

DETAILED DESCRIPTION OF THE PREFERRED EMBODIMENTS

Figure 1:
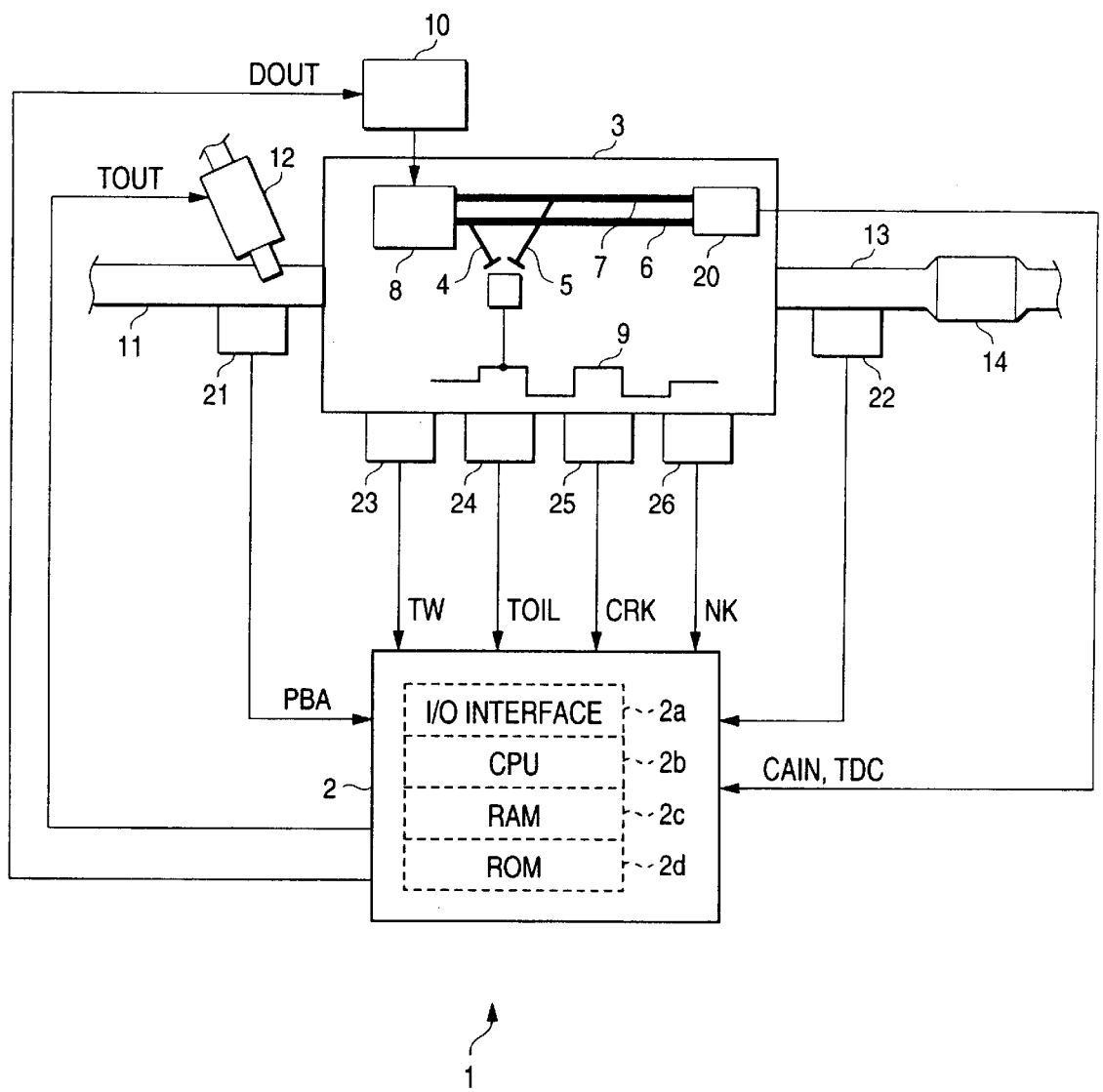
FIG. 1 is a schematic diagram showing the construction of a control device for internal combustion engines in accordance with a mode for carrying out the present invention.

Referring to the drawings, a control device according to the invention will be described below. A control device 1 for an internal combustion engine shown in FIG. 1 comprises an ECU (increase means and control means) 2, which performs cam phase control and rich spike control, which will be described later, in response to operating conditions of an internal combustion engine (hereinafter, referred to as an engine) 3.

The engine 3 is a four-cycle DOHC-type gasoline engine and comprises an intake camshaft 6 having intake cams (not shown) and an exhaust camshaft 7 having exhaust cams (not shown) for driving intake valves 4 and exhaust valves 5, respectively, so as to open and close. These intake camshaft 6 and exhaust camshaft 7 are coupled to a crankshaft 9 via a timing belt (not shown), and they rotate in conjunction with the rotation of the crankshaft 9. Cam phase changing mechanisms 8 are provided at tip portions of the intake camshaft 6 and exhaust camshaft 7, respectively. Hereinafter, a description will be given of the cam phase changing mechanism 8 provided on the intake camshaft 6 as representing the same on the exhaust camshaft 7.

The cam phase changing mechanism 8 operates when hydraulic pressure is supplied and is adapted, when in operation, to advance or retard the opening and closing timings of the intake valves 4 by advancing or retarding the phase CAIN of the intake camshaft 6 (hereinafter, simply referred to as the "cam phase CAIN") relative to the crankshaft 9 in a stepless fashion. As indicated by dotted lines in FIG. 5, when the opening and closing timings of the intake valves 4 are advanced, the valve overlap of the intake valves 4 and the exhaust valves 5 is extended, and this increases the amount of internal EGR, whereby the temperature of fuel in the engine 3 is lowered. In addition, a solenoid control valve 10 is connected to the cam phase changing mechanism 8. This solenoid control valve 10 is driven by a driving signal from the ECU 2 and supplies a hydraulic pressure from a hydraulic pump (not shown) in a lubricating system of the engine 3 to the cam phase changing mechanism 8 in response to a duty ratio DOUT of the driving signal. Thus, the ECU 2 controls the cam phase changing mechanism 8 via the solenoid control valve 10 such that the cam phase CAIN of the intake valve 4 is advanced or retarded.

Cam phase sensors 20 are provided, respectively, at opposite tip portions of the intake camshaft 6 and exhaust camshaft 7 to those where the cam phase changing mechanisms 8 are provided. These cam phase sensor 20 each comprise for example a magnet rotor and an MRE pickup, and detect the cam phase CAIN of the intake camshaft 6 and the exhaust camshaft 7 and outputs detection signals thereof to the ECU 2. The cam phase sensor 20 also outputs a TDC signal, which is a pulse signal, to the ECU 2. The TDC signal is a signal for indicating that the piston is present in the vicinity of the top dead center on its intake stroke, and is constructed such that a pulse is outputted every a cam angle which is predetermined (for instance, 45 degrees).

An injector 12 and an intake pressure sensor 21 constituted by a semiconductor pressure sensor or the like are mounted at certain positions along the length of an intake pipe 11 of the engine 3. When in operation, the injector 12 is driven by a driving signal from the ECU 2 and is controlled so as to inject fuel into the associated intake manifold 11 only for a fuel injecting time TOUT designated by the driving signal. The intake pressure sensor 21 detects an absolute pressure PBA inside the intake manifold 11 and supplies a detection signal to the ECU 2.

A catalytic converter 14 is provided at a certain position along the length of an exhaust pipe 13 of the engine 3 for purification of exhaust gas from the engine 3. This catalytic converter 14 is a combination of a NOx occlusion catalyst (not shown) for occluding NOx contained in exhaust gas resulting from lean-burn operation and a three-way catalyst (not shown) for reducing NOx contained in exhaust gas resulting from operations other than the lean-burn operation. An LAF sensor 22 is provided upstream of the catalytic converter 14 which is constituted by electrodes of zirconia and platinum. This LAF sensor 22 can detect oxygen concentration in exhaust gas in a wide range of air-fuel ratio A/F from a rich area to a lean area thereof, and outputs to the ECU 2 a detection signal in proportion to the oxygen concentration so detected.

Furthermore, a coolant temperature sensor 23 and an oil temperature sensor 24 are mounted on a main body of the engine 3, these coolant temperature sensor and oil temperature sensor being constituted by a thermistor or the like, respectively. The coolant temperature sensor 23 and oil temperature sensor 24 detect, respectively, an engine coolant temperature TW which is the temperature of coolant circulating through a cylinder block of the engine 3 and an oil temperature TOIL which is the temperature of lubricating oil (functioning also as a working fluid) of the engine 3, and output respective detection signals to the ECU 2.

A crank angle sensor 25 and a knock sensor 26 are provided on the engine 3. The crank angle sensor 25 is constituted by a combination of a magnet rotor and an MRE pickup and outputs a CRK signal which is a pulse signal to the ECU 2 as the crankshaft 9 rotates. The CRK signal is a signal indicating the rotational angle of the crankshaft 9 and is constructed so as to output one pulse every a predetermined crank angle (for example, one degree). The ECU 2 obtains the engine speed NE of the engine 3 based on this CRK signal. The knock sensor 26 is constituted by a combination of piezo-electric element and vibrator plate and is fixed to the cylinder block (not shown) of the engine 3 for outputting a knock signal NK to the ECU 2 which indicates a voltage value corresponding to knocking vibrations.

The ECU 2 is constituted by a microcomputer comprising an I/O interface 2a, a CPU 2b, a RAM 2c and a ROM 2d. The RAM 2c is designed to hold data stored therein by virtue of a back-up power supply even when the engine 3 is stopped. Detection signals from the aforesaid sensors 20 to 26 are inputted into the CPU 26 after they are A/D converted and shaped. Then, the CPU 2b determines the running condition of the engine 3 in response to these input signals and, as will be described later, determines a duty ratio DOUT for the solenoid control valve 10 and a fuel injection time TOUT for the injector 12 in accordance with a control program stored in advance in the ROM 2d and data stored in the RAM 2c. Furthermore, the CPU 2 performs the cam phase control by the cam phase changing mechanism 8 and the rich spike control in which the air-fuel ratio A/F is temporarily enriched during lean-burn operation by outputting driving signals in response to those duty ratio DOUT and fuel injection time TOUT.

Figure 2:
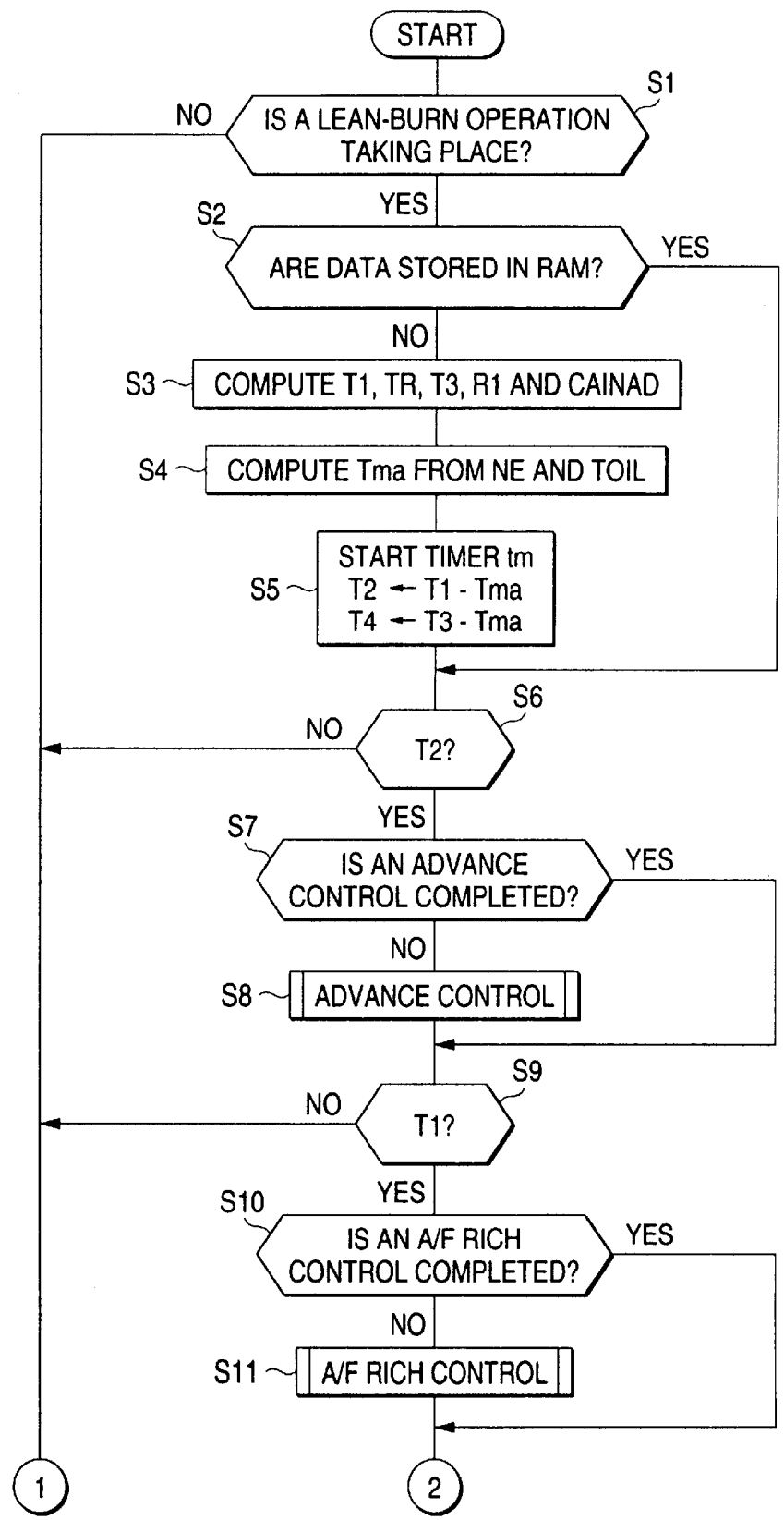
FIG. 2 is a flowchart showing a cam phase control process and a rich spike control process which are executed by the control device.
Figure 3:
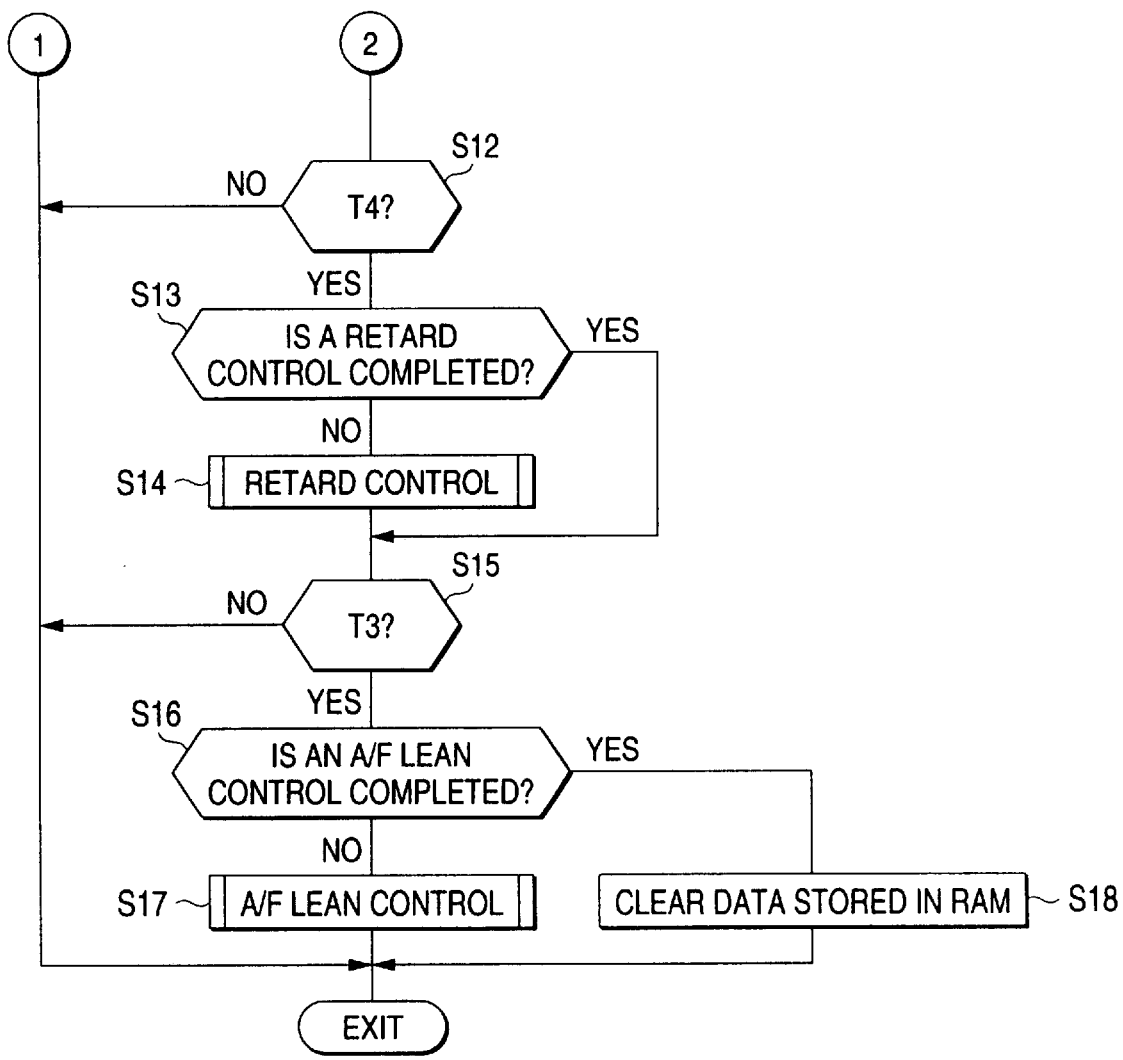
FIG. 3 is a flowchart following the flowchart shown in FIG. 2.

Hereinbelow, cam phase controlling and rich spike controlling processes will be described which are executed by the ECU 2 while the engine 3 is running. FIGS. 2 and 3 show together a flowchart for the cam phase and rich spike controlling processes, and these processes are executed periodically at predetermined intervals (for example, every 10 msec) by means of a timer so set.

As shown in FIG. 2, in this process, in step 1 (abbreviated as "S1" in the figure, and hereinafter, steps are abbreviated in a similar manner), whether or not a lean-burn operation is taking place is determined. If a determination made in step 1 is NO, in other words, it is determined that no lean-burn operation is taking place in step 1, the process is terminated. On the contrary, if the determination made in step 1 is YES, in other words, it is determined that a lean-burn operation is taking place, then the process advances to step 2, where it is determined whether or not respective data are stored in the RAM 2c which are to be obtained in step 3, as will be described later.

In step 2, if the data are determined as being stored in the RAM 2c, then the process advances to step 6, while if the data are determined as not being stored therein, then the process advances to step 3 to compute a rich transition start time T1 (a timing for starting the fuel increase), a total rich period TR, a lean transition start time T3, an enrichment amount R1 and a cam advancement amount CAINAD. Those values except for the cam advancement amount CAINAD are computed based on the engine speed NE and intake pipe internal absolute pressure PBA while referring to a map (not shown) which is stored in the ROM 2d. The cam advancement amount CAINAD is computed by referring to the map (not shown) which is stored in the ROM 2d in response to the computed enrichment amount R1 such that it becomes greater as the enrichment amount R1 becomes greater. The respective values so detected are then stored in the RAM 2c.

In step 4, a lead time Tma (a predetermined time) is computed based on the engine speed NE and the oil temperature TOIL by referring to the map (not shown) which is stored in the ROM 2d. Further, in step 5, a cam phase CAIN advance control start time T2 and a cam phase CAIN retard start time T4 are computed by subtracting the lead time Tma from the rich transition start time T1 and lean transition start time T3, respectively (T2=T1−Tma, T4=T3−Tma). These values T2 and T4 so computed are then stored in the RAM 2c. Simultaneously with this, a timer tm of up-count type is started.

The reason for the computation of the lead time Tma as described above will be described as follows. Even if the cam phase CAIN advance operation by the cam phase changing mechanism 8 is attempted to electrically be synchronized with the air-fuel enrichment operation by virtue of fuel injection by the injector 12, the response of the cam phase changing mechanism 8 adapted to be driven hydraulically is low. Therefore, there is caused a delay in response in starting a cam phase advance operation, compared with the start of an air-fuel ratio A/F enrichment operation because. Furthermore, since the cam phase changing mechanism 8 is driven hydraulically, the degree of delay in response changes in accordance with the engine speed NE and the oil temperature TOIL, and to be specific, the faster the engine speed NE or the higher the oil temperature TOIL, the smaller the degree of delay in response becomes. Thus, the lead time Tma is computed so as to compensate for such a delay in response to thereby actually synchronize the start of the cam phase CAIN advance operation by the cam phase changing mechanism 8 with the start of the air-fuel ratio A/F enrichment operation by virtue of fuel injection by the injector 12 (a state indicated by dotted lines in FIG. 4).

Furthermore, the process proceeding to step 6, it is determined whether or not the count value of the timer tm becomes the advance control start time T2. In step 6, when it is determined that the count value of the timer tm does not become the advance control start time T2, then the process is terminated. On the contrary, when it is determined that the timer count value becomes the advance control start time T2 (at time t2 in FIG. 4), the process then proceeds to step 7 to determine whether or not the cam phase CAIN advance control is completed. In this case, if the cam phase CAIN detected by the cam phase sensor 20 is advanced to a cam phase CAINR which will be described later, it is determined that the cam phase CAIN advance control is completed, and on the contrary, the cam phase CAIN so detected is not advanced to the cam phase CAINR, then it is determined that the control is not completed.

Figure 4:
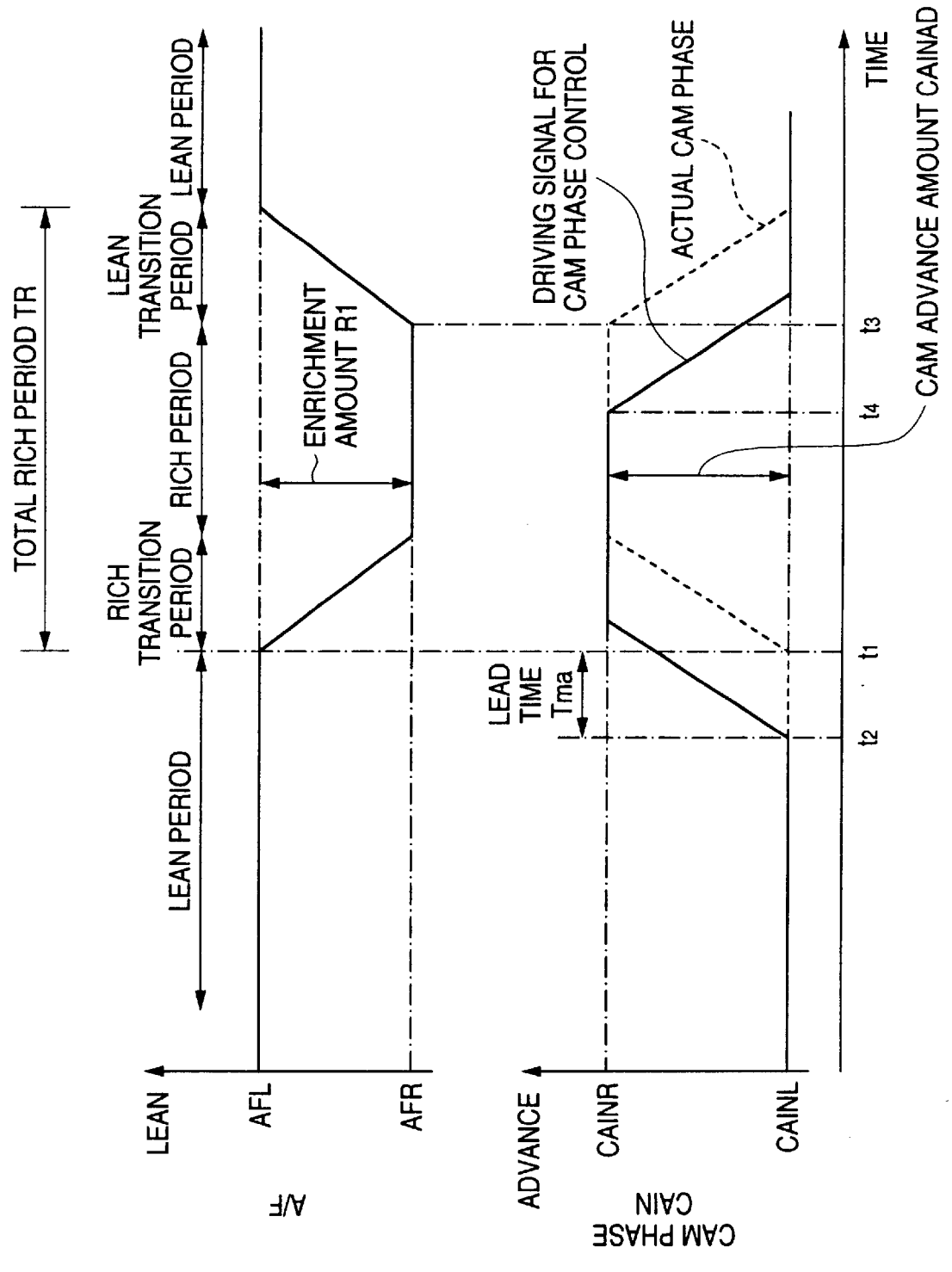
FIG. 4 is a time chart showing changes in the cam phase and air-furl ratio resulting when the cam phase control and the rich spike control are carried out.

In-step 7, when it is determined that the advance control of the cam phase CAIN is completed, then the process advances to step 9, while when it is determined that the advance control is not completed, in step 8, the advance control of the cam phase CAIN is executed. This cam phase CAIN advance control is carried out by advancing the cam phase from a cam phase CAINL at the time of lean-burn operation by a predetermined amount ΔCAINAD every time the present step 8 is executed once. In this case, this predetermined amount ΔCAINAD is a value obtained by dividing the cam advance amount CAINAD obtained in step 3 by a predetermined number N1, which is determined from the respective times T1, TR, T3 computed in step 3 above. Specifically speaking, the cam phase changing mechanism 8 is driven by supplying a driving signal of the duty ratio DOUT corresponding to the predetermined amount ΔCAINAD to the solenoid control valve 10 so as to advance the cam phase CAIN by the predetermined amount ΔCAINAD. As shown in FIG. 4, the cam phase CAIN is gradually advanced through the advance control described above, and it is finally advanced to the cam phase CAINR (=CAINL+ CAINAD).

In step 9, thereafter, it is determined whether or not the count value of the timer tm becomes the rich transition start time T1. In this case, too, when it is determined that the count value does not become the rich transition start time T1, the process is terminated. On the contrary, when it is determined that the count value of the timer tm becomes the rich transition start time T1 (time t1 in FIG. 4), then the process proceeds to step 10, where it is determined whether or not an A/F enrichment control is completed. In this case, if the air-fuel ratio A/F becomes a value AFR which will be described later, it is determined that the A/F enrichment control is completed, while if the air-fuel ration A/F does not become the value AFR, then it is determined that the A/F enrichment control is not yet completed.

In step 10, when the A/F enrichment control is completed, then the process proceeds to step 12 in FIG. 3. In contrast, when the enrichment control is not yet completed, then the process proceeds to step 11, where the A/F enrichment control is executed. In this A/F enrichment control, the air-fuel ratio A/F is enriched by extending the fuel injection time TOUT of the injector 12 by a predetermined time ΔTOUT every time the present step 11 is executed once. In this case, the predetermined time ΔTOUT is set to a value resulting when an increment of the fuel injection time needed to enrich the air-fuel ratio A/F by the enrichment amount R1 in step 3 above is divided by the predetermined number N1 which is the same as that used in the advance control of the cam phase CAIN. As shown in FIG. 4, the air-fuel ratio A/F is gradually enriched from the value AFL resulting in the lean-burn operation to the value AFR which is enriched by the enrichment amount R1 obtained in step 3 above through the A/F enrichment control described heretofore.

Next, in step 12 in FIG. 3, it is determined whether or not the count value of the timer tm becomes the retard control start time T4. In step 12, when it is determined that the count value does not become the retard control start time T4, the present process is terminated. In contrast, when it is determined that the count value becomes the retard control start time T4 (a time t4 in FIG. 4), then the process proceeds to step 13, where it is determined whether or not a retard control of the cam phase CAIN is completed. In this case, if the cam phase CAIN is retarded to the cam phase CAINL in the lean-burn operation, it is determined that the retard control of the cam phase CAIN is completed, while if it is not yet retarded thereto, then it is determined that the relevant control is not yet completed.

In step 13, when it is determined that the retard control of the cam phase CAIN is completed, then the present control proceeds to step 15, and in contrast when it is determined that the retard control is not completed, in step 14, a retard control of the cam phase CAIN is executed. On the contrary to the operation carried out in step 8, this cam phase CAIN retard control is performed by retarding the cam phase CAIN by the predetermined value ΔCAINAD described in step 8 every time the present step 14 is executed once. The cam phase CAIN is gradually retarded, as shown in FIG. 4, from the cam phase CAINR to the cam phase CAINL resulting in the lean-burn operation through the retard control described heretofore.

In step 15, thereafter, it is determined whether or not the count value of the timer tm becomes the lean transition start time T3. When it is determined that the count value does not become the lean transition start time T3, then the present process is terminated, while it is determined that the value becomes the lean transition start time T3, then the process proceeds to step 16, where it is determined whether or not the A/F control is completed. In this case, if the air-fuel ratio A/F becomes the value AFL resulting in the lean-burn operation, it is then determined that the A/F lean control is completed, while if the air-fuel ratio A/F does not become the value AFL, then it is determined that the A/F lean control is not yet completed.

In step 16, when the A/F lean control is completed, then the process advances to step 18 to reset the respective values computed in the previous steps 3 to 5 and stored in the RAM 2c and the count value of the timer tm, the present process being terminated. On the contrary, when the A/F lean control is not completed in step 16, the process then proceeds to step 17, where the A/F lean control is executed. This A/F lean control is designed to make the air-fuel ratio A/F lean by shortening the fuel injection time TOUT of the injector 12 by the predetermined time ΔTOUT every time the present step 17 is executed once. As shown in FIG. 4, the air-fuel ratio A/F is gradually made to lean from the value AFR which is enriched by the enrichment amount R1 to the value AFL resulting in the lean-burn operation through the A/F lean control described heretofore. Thus, the cam phase control and rich spike control processes are executed, respectively, as described above, and the execution timings (or execution intervals) and execution times thereof are determined by the respective times set in steps 3 to 5, respectively.

Referring to FIG. 4, changes in air-fuel ratio A/F and cam phase CAIN resulting when the aforesaid cam phase control and rich spike control processes are carried out. As shown in the figure, the air-fuel ratio A/F starts to change from the value AFL resulting in the lean-burn operation to the rich side at the rich transition start time t1 (a time when the count value of the timer tm becomes T1). Thereafter, the air-fuel ratio A/F changes substantially linearly from the value AFL resulting in the lean-burn operation to the value AFR which is enriched by the enrichment amount R1 and finally becomes the value AFR, and this state is held until the lean transition start time t3 (a time when the count value of the timer tm becomes T3). Furthermore, the air-fuel ratio A/F starts to change to the lean side at the time t3 and continues to change substantially linearly to the value AFL resulting in the lean-burn operation. Then, the rich spike control is completed when the air-fuel ratio A/F passes the total rich period TR. Thus, NOx occluded in the occlusion catalyst of the catalytic converter 14 is expelled therefrom through the rich spike control in which the air-fuel A/F is changed as described heretofore to thereby restore the NOx occlusion capability, and the NOx so expelled is then reduced by means of the three-way catalyst.

On the other hand, the driving signal for controlling the cam phase is outputted as indicated by solid lines. In other words, the driving signal starts the advance of the cam phase CAIN at the advance control start time t2 (a time when the count value of the timer tm becomes T2) which precedes the time t1 by the lead time Tma and keeps it changing substantially linearly from the cam phase CAINL resulting in the lean-burn operation to the cam phase CAINR. Thereafter, the driving signal finally changes the cam phase CAIN to the cam phase CAINR and keeps this state until the retard control start time t4 (a time when the count value of the timer tm becomes T4). Then, the driving signal makes the cam phase start to change toward the retard side at the retard control start time t4 and keeps it changing substantially linearly to the cam phase CAINL resulting in the lean-burn operation. However, the cam phase CAIN actually changes as indicated by dotted lines in the figure due to the delay in response of the cam phase changing mechanism 8 when it is actuated. In other words, the advance operation is started at the rich transition start time t1 in synchronism with the timing when the air-fuel ratio A/F starts to be enriched, and further the retard operation is started at the lean transition start time t3 in synchronism with the timing when the air-fuel ratio A/F starts to be made to lean.

As has been described in detail heretofore, according to the control device 1 for internal combustion engines according to the invention, the NOx occlusion catalyst of the catalytic converter 14 can be purged of the NOx occluded therein by performing the rich spike control described above, that is, by increasing the amount of fuel such that the air-furl ratio A/F used in the lean-burn operation is enriched by the enrichment amount R1, whereby the NOx occlusion capability of the catalyst can be restored.

Figure 6:
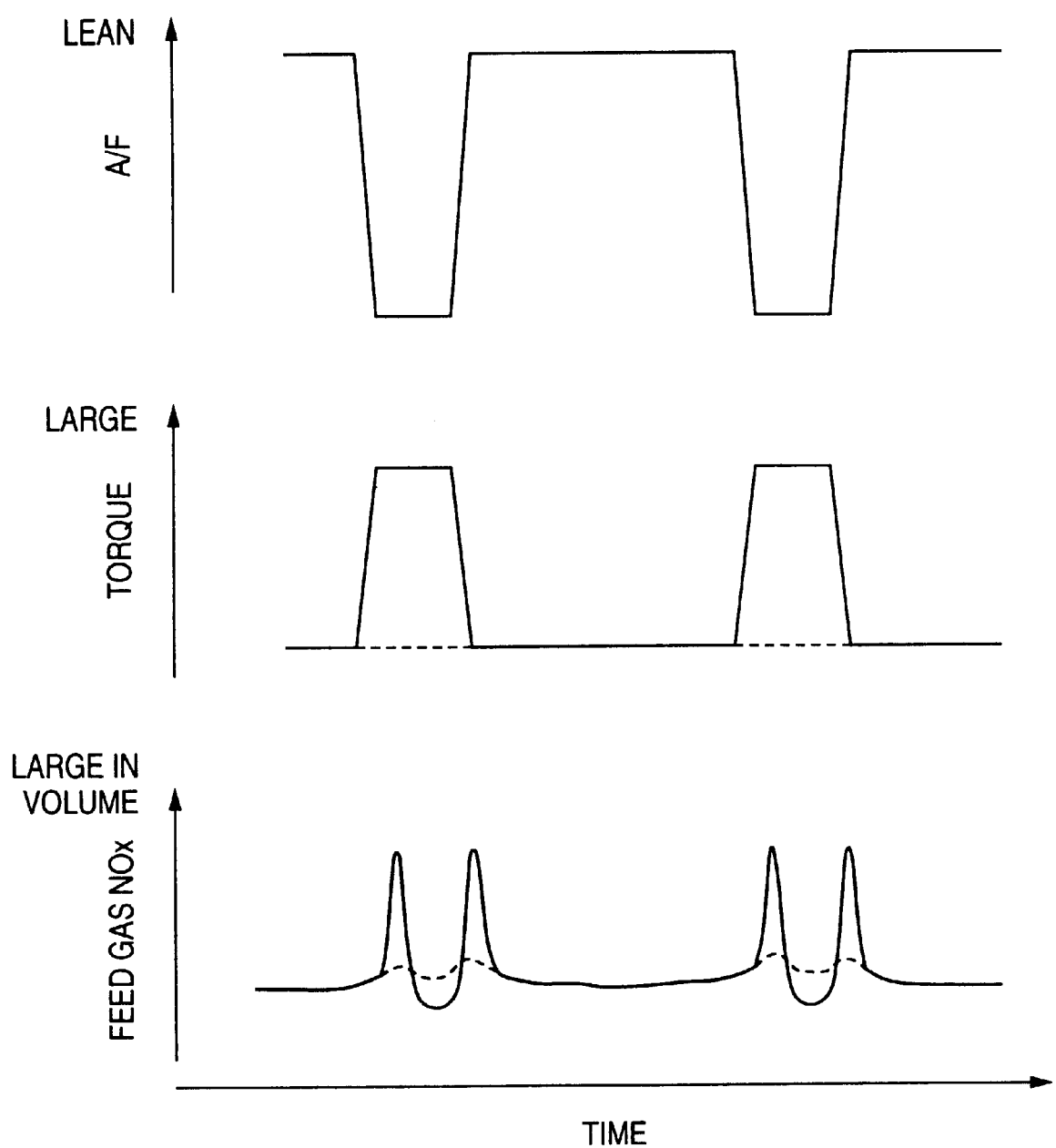
FIG. 6 is a time chart showing changes in air-fuel ratio, torque and NOx resulting when the rich spike control is executed.

In addition, since the cam phase CAIN is advanced and the cam advance amount CAINAD is obtained in response to the enrichment amount R1 of the air-fuel ratio A/F when the air-fuel ratio A/F is enriched during the lean-burn operation, the valve overlap can be extended to suitably increase the amount of internal EGR in response to the increase in amount of NOx and the torque fluctuation both resulting in conjunction with enrichment of the air-fuel ration A/F, whereby the combustion temperature can properly be lowered. As a result of this, the increase in amount of NOx and the torque fluctuation resulting from the enrichment of the air-fuel ratio A/F can be suppressed (the state indicated by the dotted lines in FIG. 6), thereby making it possible to improve the drivability. In addition, due to the increase in amount of EGR which is an inert gas, less fuel is required to enrich the air-fuel ratio A/F by the enrichment amount R1 when compared with a case where the amount of EGR is small, thereby making it possible to further improve the fuel consumption.

Furthermore, since the cam phase CAIN advance start timing and the air-fuel ratio A/F enrichment starting timing are synchronized with each other by compensating for the delay in response of the cam phase changing mechanism 8 when it is actuated, that is, by advancing the start of the cam phase CAIN advance by the cam phase changing mechanism 8 by a time equal to the lead time Tma obtained in response to the engine speed NE and the oil temperature TOIL. Accordingly, the amount of NOx and the torque fluctuation can be suppressed at a suitable timing without being affected by variations in the engine speed NE and the oil temperature TOIL.

Moreover, since the amount of NOx can be suppressed in such a manner as is described above, the execution time of the rich spike control can be extended to thereby reduce the frequency at which such a control is executed, whereby it is possible to improve the fuel economy.

In the above embodiment, the cam phase changing mechanism 8 adapted to be driven hydraulically is used as a cam phase mechanism for changing the phase of the intake camshaft 6 relative to the crankshaft 9, but the present invention is not limited thereto and a cam phase changing mechanism of any type may be used provided that the phase of the intake camshaft 6 can properly be changed which includes an electric cam phase changing mechanism and a pneumatically driven cam phase chaining mechanism.

In addition, in the above embodiment, the cam phase control has been described representatively in which the phase of the intake camshaft 6 is advanced in enriching the air-fuel ratio A/F, but a cam phase control can be executed in which the phase of the exhaust camshaft 7 is retarded when attempting to enrich the air-fuel ratio A/F with the cam phase changing mechanism 8 on the exhaust side. In this case, in step 3 in FIG. 2, a retard amount is obtained instead of the advance amount CAINAD, and in steps 7 and 8, the determination of the completion of a retard control, instead of the advance control, and a retard control based on the retard amount obtained in step 3 are executed, respectively. In addition, in steps 13 and 14 in FIG. 3, the determination of the completion of an advance control, instead of the retard control and an advance control are executed, respectively.

Figure 5:
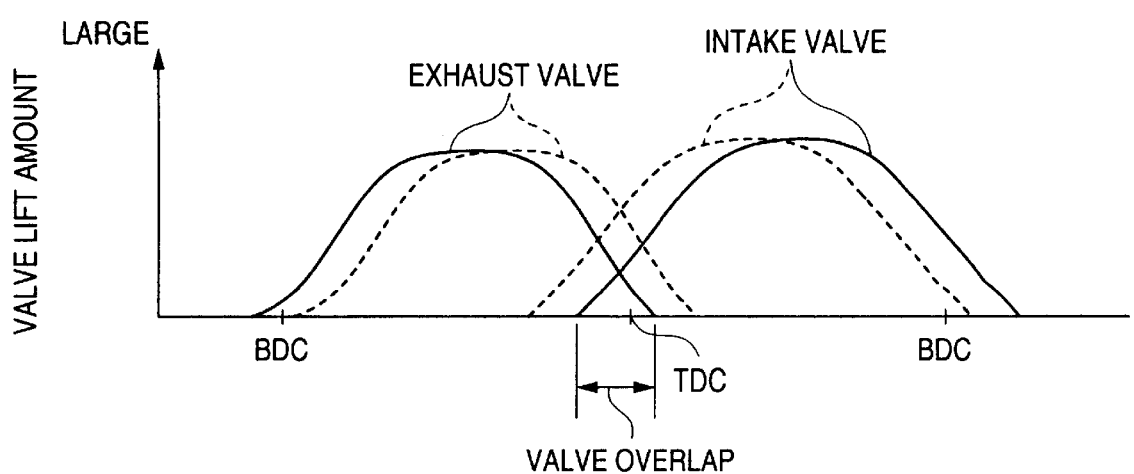
FIG. 5 is a time chart showing opening and closing timings of intake and exhaust valves.

If the cam phase control is executed as described above, when the cam phase of the exhaust camshaft 7 is retarded, as indicated by the dotted lines in FIG. 5, the overlap of the intake valve 5 and the exhaust valve 5 is extended when the opening and closing timings of the exhaust valve are retarded. Accordingly, an advantage can be obtained that the amount of internal EGR is increased as well as in the case with the advance of the cam phase of the intake camshaft 6. In addition, in this case, assuming that the advance direction of the cam phase in FIG. 4 is the retard direction of the cam phase of the exhaust camshaft 7, the cam phase of the exhaust camshaft 7 changes in the same manner as did the cam phase shown in the same figure.

Furthermore, the aforesaid cam phase control in which the phase of the exhaust camshaft 7 is retarded and the cam phase control in which the phase of the intake camshaft 6 is advanced may be used together when enriching the air-fuel ratio A/F.

As has been described heretofore, according to the control device for internal combustion engines of the present invention, the drivability can be improved by suppressing the torque fluctuation. In addition, the fuel consumption can be improved by reducing the frequency at which the rich spike control is carried out.

What is claimed is:
1. A control device for an internal combustion engine, said engine comprising:
   an intake camshaft for opening and closing an intake valve;
   an exhaust camshaft for opening and closing an exhaust valve;

a cam phase changing mechanism changeable at least one of a phase of said intake camshaft and a phase of said exhaust camshaft relative to a crankshaft; and a $NO_x$ occlusion catalyst occluding $NO_x$ produced in a lean-burn operation, said control device comprising:

an increasing unit increasing the amount of fuel to as to enrich an air-fuel ratio in said lean-burn operation by a predetermined degree of richness, to thereby purge $NO_x$ occluded in said $NO_x$ occlusion catalyst; and a control means performing at least one of a control changing the phase of said intake camshaft such that the phase of said intake camshaft advances relative to said crankshaft and a control changing the phase of said exhaust camshaft such that the phase of said exhaust camshaft retards relative to said crankshaft, in response to said predetermined degree of richness of said air-fuel ratio, wherein the advancement of the said intake camshaft and the retardation of said exhaust camshaft extend a valve overlapping period such that said intake valve and said exhaust valve are both open.

2. A control device for an internal combustion engine as set forth in claim 1, wherein said cam phase changing mechanism is hydraulically driven, and wherein said control unit controls the driving of said cam phase changing mechanism such that said control changing at least one of the phase of said intake camshaft and the phase of said exhaust camshaft is performed at a predetermined time prior to a time when the fuel increase is started by said increasing unit.

3. A control device for an internal combustion engine as set forth in claim 2, wherein said predetermined time is computed by an engine speed and an oil temperature.

4. A control device for an internal combustion engine as set forth in claim 1, wherein said control unit controls the driving of said cam phase changing mechanism such that said control changing at least one of the phase of said intake camshaft and the phase of said exhaust camshaft is performed at a predetermined time prior to a time when the fuel increase is started by said increasing unit.

5. A control device for an internal combustion engine as set forth in claim 4, wherein said predetermined time is computed such that the start timing of the fuel increment by said increasing unit is synchronized with the start timing of at least one of the advance of the phase of said intake camshaft and the retard of the phase of said exhaust camshaft.

6. A control device for an internal combustion engine as set forth in claim 1, wherein the valve overlapping period is extended in relation to an increase of the richness of the air-fuel ratio.

* * * * *